Dec. 8, 1942.  W. W. OAKLEY  2,304,196
GLASS MELTING TANK STRUCTURE
Filed Dec. 26, 1940
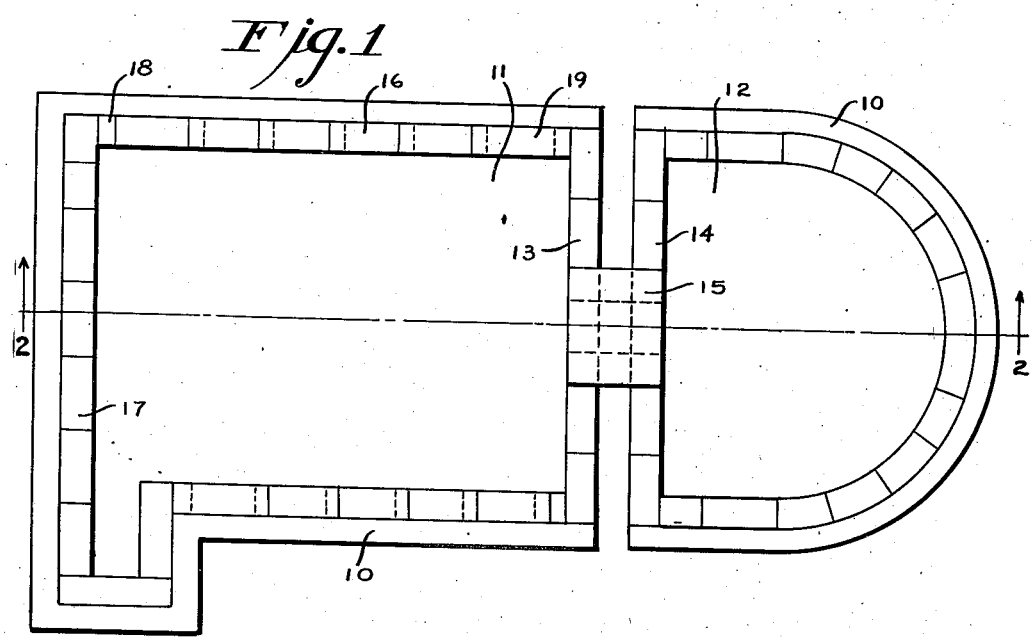
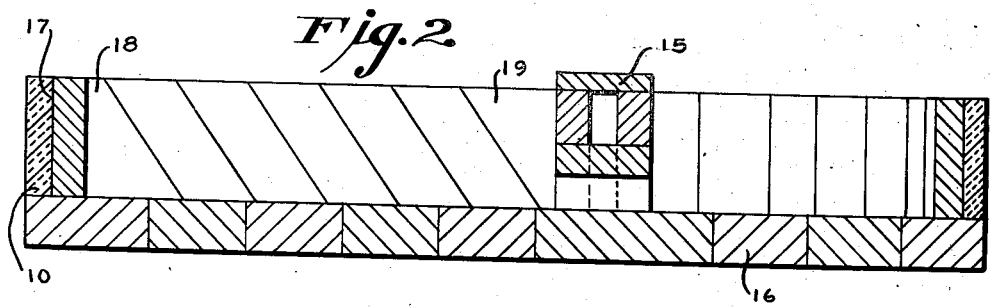
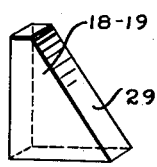 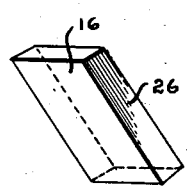
Inventor
WALTER W. OAKLEY
By F. H. Knight
Attorney Patented Dec. 8, 1942

2,304,196

UNITED STATES PATENT OFFICE 2,304,196

GLASS MELTING TANK STRUCTURE

Walter W. Oakley, Corning, N. Y., assignor to Corning Glass Works, Corning, N. Y., a corporation of New York Application December 26, 1940, Serial No. 371,759

12 Claims. (Cl. 49—54)

The present invention relates to glass melting furnace structures and particularly to portions of such structures in contact with molten glass.

Among the chief problems which have to be dealt with in the design and construction of a glass melting tank are ways of preventing leakage of the liquid glass between the seams formed by the adjoining refractory blocks of the tank walls. It is common practice to construct a tank side wall of a material having a different coefficient of expansion than that of the material forming the tank bottom. By way of example, the bottom may be composed of refractory units of clay and the side walls of refractory units of a much denser material, as for instance that known to the trade as "Corhart" Electrocast. With such a combination, the side wall seams may open up as much as ¼" when the tank is heated up and before it is filled. It is very desirable to be able to insulate the tank side walls against excessive heat loss and it is especially important that the seams of the walls of a tank to be insulated do not open up an appreciable extent as otherwise excessive leakage will occur at the seams, owing to the higher temperature of the insulated refractory than one exposed directly to atmosphere. Especially is the danger of leakage great at those seams in the vicinity of the top of the side walls of the melting portion of the tank where the glass fluidity and its corrosive action are the greatest.

Another problem involves the working out of a design wherein a minimum number of the junctions or seams of adjoining units are likely to run in lines parallel to the convectional currents of the exceedingly corrosive glass within the melting end of the tank structure.

The prime object of the present invention is a tank wall structure whose seams between adjacent blocks, especially those in the vicinity of the top level of glass, are automatically kept closed throughout the entire life of the structure.

Another object of the invention is a tank structure whose refractory blocks, in portions where the glass temperatures run the highest and the destructive action on the refractory blocks resulting from convectional currents is most pronounced, are so arranged that the seams formed by adjoining blocks run transversely of the direction of glass flow.

In the accompanying drawing,

Fig. 1 is a plan view of a structure embodying the invention;

Fig. 2 is a view in sectional elevation taken on lines 2—2 of Fig. 1; and

Figs. 3 and 4 are perspective views of refractory blocks employed in the novel portions of the foregoing structure.

The tank illustrated is divided into melting and fining sections 11 and 12 respectively by conventional forms of walls 13 and 14 and a conventional throat or bridge wall assembly 15. Also the bottom 16 of the entire structure and the end wall 17 of the melting section are conventional. The outer walls of the structure are shown as covered with thermal insulation 10 which may be of any suitable form.

The present invention is embodied solely in the side walls of the melting section 11 of the illustrated structure. These side walls each comprises a number of parallelepiped refractory units 16 arranged between walls 13 and 17 with their larger rectangular surfaces in abutting relation and each having one of its oppositely disposed small rectangular surface areas resting on the tank bottom 16. Each of the units is of a height corresponding to that of the conventional end wall 17, its small top rectangular surface forming a part of the top of the finished side wall. End units, such as 18 and 19 corresponding in shape to the unit 18—19 of Fig. 3, fill the triangular shaped spaces in the walls between the units and walls 17 and 13.

As will be apparent, the rectangular surface of unit 19 corresponding to 29 of unit 18—19, as arranged, bears against the adjoining rectangular surface area 26 of a parallelepiped unit 16 and in a similar fashion the corresponding and oppositely disposed surface areas of the remaining units 16 are held in close contact with one another and with the surface area of unit 18 corresponding to 29 of unit 18—19, owing to the fact that their centers of gravity fall outside their surface areas on which they rest on bottom 16. It follows, therefore, that irrespective of temperature changes which occur during the operating life of the structure at least the seams of adjoining units 16, 18 and 19 will remain closed in the vicinity of the normal top level of fluid in the tank where, in the past, the danger of leakage has been greatest.

While in the foregoing there has been shown and described the preferred embodiment of the invention with the invention illustrated as applied only to selected side walls of a structure, it is to be understood that applicant recognizes that more extensive use of the invention in certain tank structures may be warranted and that such more extensive use of the invention and/or minor changes in the details of construction and combination of parts may be resorted to without departing from the spirit and scope of the invention as herein claimed.

What is claimed is:

1. A tank wall structure including a row of oblique parallelepiped refractory blocks arranged in a vertical plane with their lateral edges adjacent one another.

2. In a tank wall structure, a bottom of refractory material, and a side wall including a row of oblique parallelepiped refractory units each resting on said bottom and extending the full height of the tank wall of which they each form a part.

3. In a tank assembly, a plurality of oblique parallelepiped refractory units arranged with their lateral edges adjacent one another with each intermediate block of the assembly assisting in holding one of the adjoining blocks in position in the assembly and is itself held in position in part by the other of the adjoining blocks.

4. In a tank structure, a row of oblique parallelepiped refractory units resting on their bases and having the surface areas thereof which are bounded by their lateral edges abutted to form a tank wall.

5. In a tank wall structure a horizontal row of oblique parallelepiped refractory units of a length between their smaller oppositely disposed rectangular surface areas corresponding to the height of the wall of which they form a part, said units being arranged in the wall with their larger rectangular surface areas abutting one another and their smaller oppositely disposed surface areas arranged in parallel horizontal planes.

6. In a glass melting tank structure, a vertical side wall including parallelepiped refractory blocks having horizontally positioned bases and top faces and vertically positioned inner and outer faces, the contacting faces of consecutive blocks being inclined to the vertical.

7. In a glass melting tank structure, a vertical side wall including parallelepiped refractory tank blocks having bases and top faces in horizontal planes and each having a surface adjoining another of said blocks intersecting vertical planes passing through the base of the adjoining block.

8. In a glass melting tank structure, a vertical side wall including parallelepiped refractory tank blocks having horizontally disposed bases and top faces, each block having a surface adjoining another of said blocks intersecting vertical planes through its top surface.

9. In a glass melting tank structure, a vertical side wall including parallelepiped refractory tank blocks having horizontally disposed bases and top faces, each block having a surface adjoining another of said blocks intersecting vertical planes through its top surface and the base of the adjoining block.

10. In a glass melting tank structure, a vertical side wall including parallelepiped refractory tank blocks having horizontally disposed bases and top faces, each block having a surface adjoining another of said blocks intersecting vertical planes passing through its base and the top of the adjoining block.

11. In a glass melting tank structure, a side wall which includes oblique parallelepiped refractory blocks arranged in a vertical plane with their lateral edges abutting one another.

12. The method of sealing the side walls of a glass melting tank against seepage of glass through the joints thereof which comprises inclining the blocks forming the side walls of the tank to an extent sufficient to throw the center of gravity of each block outside its base and arranging said blocks adjacent to one another in a vertical plane with the upper portion of one block extending horizontally over the base of the next adjacent block thereby supporting said blocks one on another so that the inclined joints between blocks are maintained closed by the action of gravity.

WALTER W. OAKLEY.